US010713655B1

(12) United States Patent
McClintock et al.

(10) Patent No.: US 10,713,655 B1
(45) Date of Patent: Jul. 14, 2020

(54) MIGRATING USER ACCOUNTS FROM ASSISTED TO SELF-MANAGED

(71) Applicant: Amazon Technologies, Inc., Seattle, WA (US)

(72) Inventors: Jon Arron McClintock, Seattle, WA (US); Mayur Sharma, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 643 days.

(21) Appl. No.: 15/353,568

(22) Filed: Nov. 16, 2016

(51) Int. Cl.
| G06Q 20/18 | (2012.01) |
| G06Q 20/40 | (2012.01) |
| H04L 29/06 | (2006.01) |
| G06Q 20/32 | (2012.01) |

(52) U.S. Cl.
CPC ......... *G06Q 20/4014* (2013.01); *G06Q 20/18* (2013.01); *G06Q 20/3223* (2013.01); *H04L 63/08* (2013.01); *H04L 63/102* (2013.01)

(58) Field of Classification Search
CPC ..................................................... G06Q 40/00
USPC .......................................................... 705/35
See application file for complete search history.

(56) References Cited

U.S. PATENT DOCUMENTS

| 6,785,671 | B1 * | 8/2004 | Bailey | G06Q 10/02 |
| | | | | 705/5 |
| 7,433,832 | B1 * | 10/2008 | Bezos | G06Q 10/10 |
| | | | | 705/26.8 |
| 9,166,961 | B1 * | 10/2015 | Johansson | H04L 63/08 |
| 9,397,989 | B1 * | 7/2016 | Ramalingam | H04L 63/08 |
| 9,491,155 | B1 * | 11/2016 | Johansson | H04L 63/0807 |
| 2002/0077973 | A1 * | 6/2002 | Ronchi | G06Q 20/10 |
| | | | | 705/39 |
| 2012/0079126 | A1 * | 3/2012 | Evans | H04L 67/1095 |
| | | | | 709/230 |
| 2012/0246073 | A1 * | 9/2012 | Gore | G06Q 20/12 |
| | | | | 705/44 |
| 2013/0198822 | A1 * | 8/2013 | Hitchcock | G06F 21/335 |
| | | | | 726/6 |
| 2013/0198824 | A1 * | 8/2013 | Hitchcock | G06F 21/00 |
| | | | | 726/6 |
| 2015/0046990 | A1 * | 2/2015 | Oberheide | G06F 21/32 |
| | | | | 726/6 |

(Continued)

OTHER PUBLICATIONS

China's Healthcare Revolution Goes Digital May 6, 2015 (Year: 2015).*

*Primary Examiner* — Bruce I Ebersman
(74) *Attorney, Agent, or Firm* — Thomas | Horstemeyer, LLP (57) ABSTRACT

Disclosed are various embodiments for transitioning user accounts from an assisted status to a self-managed status. In one embodiment, a service receives an authentication request from a client device, where the authentication request specifies a unique user identifier corresponding to a communication channel. The service then determines that the unique user identifier corresponds to an assisted user account but the client device is not logged in under an assisting user account. The service generates an ephemeral security credential and sends the ephemeral security credential to the communication channel. The service then creates a self-managed user account having the unique user identifier in response to receiving the ephemeral security credential from the client device.

20 Claims, 6 Drawing Sheets

(56) References Cited

U.S. PATENT DOCUMENTS

2015/0081534 A1* 3/2015 Zamer .................. G06Q 20/102
  705/40
2015/0088731 A1* 3/2015 Ackerman ......... G06Q 30/0603
  705/39

* cited by examiner

MIGRATING USER ACCOUNTS FROM ASSISTED TO SELF-MANAGED

BACKGROUND

Although electronic commerce may seem ubiquitous, there are several prerequisites to be met for customers to participate. A user would need an appropriate computing device, such as a desktop, a laptop, a tablet, or a smartphone, along with Internet access. In addition, the user would need to have a certain expertise or comfort level with the technology in order to navigate a network site or application. Not all people, both within the United States and in other countries, can meet these criteria, and thus they have generally been excluded from participating in electronic commerce. Consequently, such people have not been able to avail themselves of the many benefits of electronic commerce, including convenience, selection, and lower prices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to migrating user accounts from an assisted status to a self-managed status. Many people have been excluded from participating in electronic commerce because they lack appropriate computing devices with network access or because they lack expertise or familiarity with the technology. In order to allow such people to become customers, an electronic commerce provider may partner with brick-and-mortar establishments to offer an assisted shopping experience. With assisted shopping, a shopkeeper or other agent may assist a customer in placing an order with an electronic commerce provider via a kiosk or other terminal. In some cases, the customers may lack language skills necessary to interact directly with the user interfaces of the electronic commerce provider, and the shopkeeper or other agent may help with navigation or translation. An account may be created on behalf of the customer in order to keep track of the customer's order history, contact information, shipping addresses, search history, and so forth.

Although some customers may be content with participating in an assisted shopping experience indefinitely, others will no doubt develop technical expertise or obtain technology that will allow them to interact with the electronic commerce provider directly, without the need for an intermediary or assistant. Various embodiments of the present disclosure introduce approaches for transitioning accounts for these users from an assisted status to a self-managed status, while maintaining security of the users' information and allowing the users to remain associated with their previous orders and information.

The system described herein presents many technical improvements to the functioning of computer systems. For example, due to the migration of user accounts from assisted status to self-managed status, significant quantities of previously gathered data can remain associated with the user, as opposed to systems that would create entirely new accounts. Also, through the use of separate assisted user accounts in conjunction with assisting user accounts, personalization information and transaction information can be grouped with a user account to whom it pertains. By requesting new credentials from a user when converting to self-managed status, the system herein maintains appropriate levels of security and system integrity, as the other credentials may be compromised due to access by assisting users or via compromise of the assisting user systems or kiosks. Also, the security of the computer systems are improved by verifying that users have access to a predefined communication channel that is associated with an assisted user account before migrating an account to self-managed status.

Figure 1:
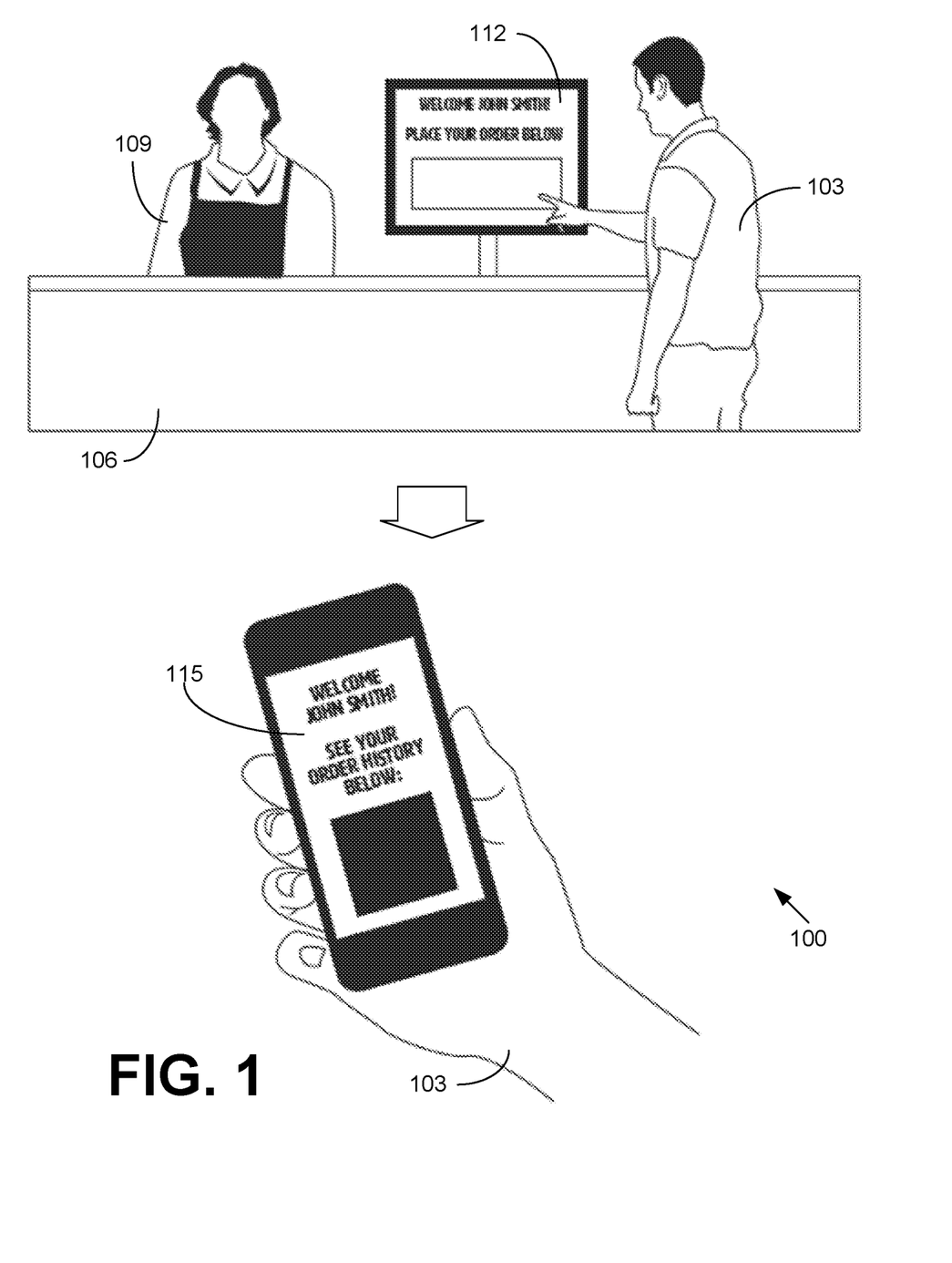
FIG. 1 is a drawing of an example scenario involving a user who transitions from an assisted account to a self-managed account according to various embodiments of the present disclosure.

Referring now to FIG. 1, shown is a drawing of an example scenario 100 involving a user 103 who transitions from an assisted account to a self-managed account according to various embodiments. To begin, a user 103 named "John Smith" visits a physical store 106 that offers assisted shopping for an electronic commerce provider. The user 103 interacts with a sales assistant 109, who may be an employee or agent of the physical store 106. The sales assistant 109 may create an account for the user 103 with the electronic commerce provider and then may assist the user 103 in placing an order with the electronic commerce provider via a kiosk 112 or another system. The user 103 may return multiple times to the physical store 106 to place orders in this way.

Subsequently, suppose that the user 103 obtains a client device 115 such as a smartphone, a tablet, or another device. According to the principles of the present disclosure, the user 103 is able to authenticate himself or herself with the electronic commerce provider and migrate his or her account from an assisted state to a self-managed state. As compared with creating an entirely new account, this migrated account remains associated with the previous order history and information of the user 103 from the assisted state. This allows for accessing information about and/or managing previously placed orders, as well as maintaining personalizations and appropriate recommendations tailored towards the interests of the user 103. In the following discussion, a general description of the system and its components is provided, followed by a discussion of the operation of the same.

Figure 2:
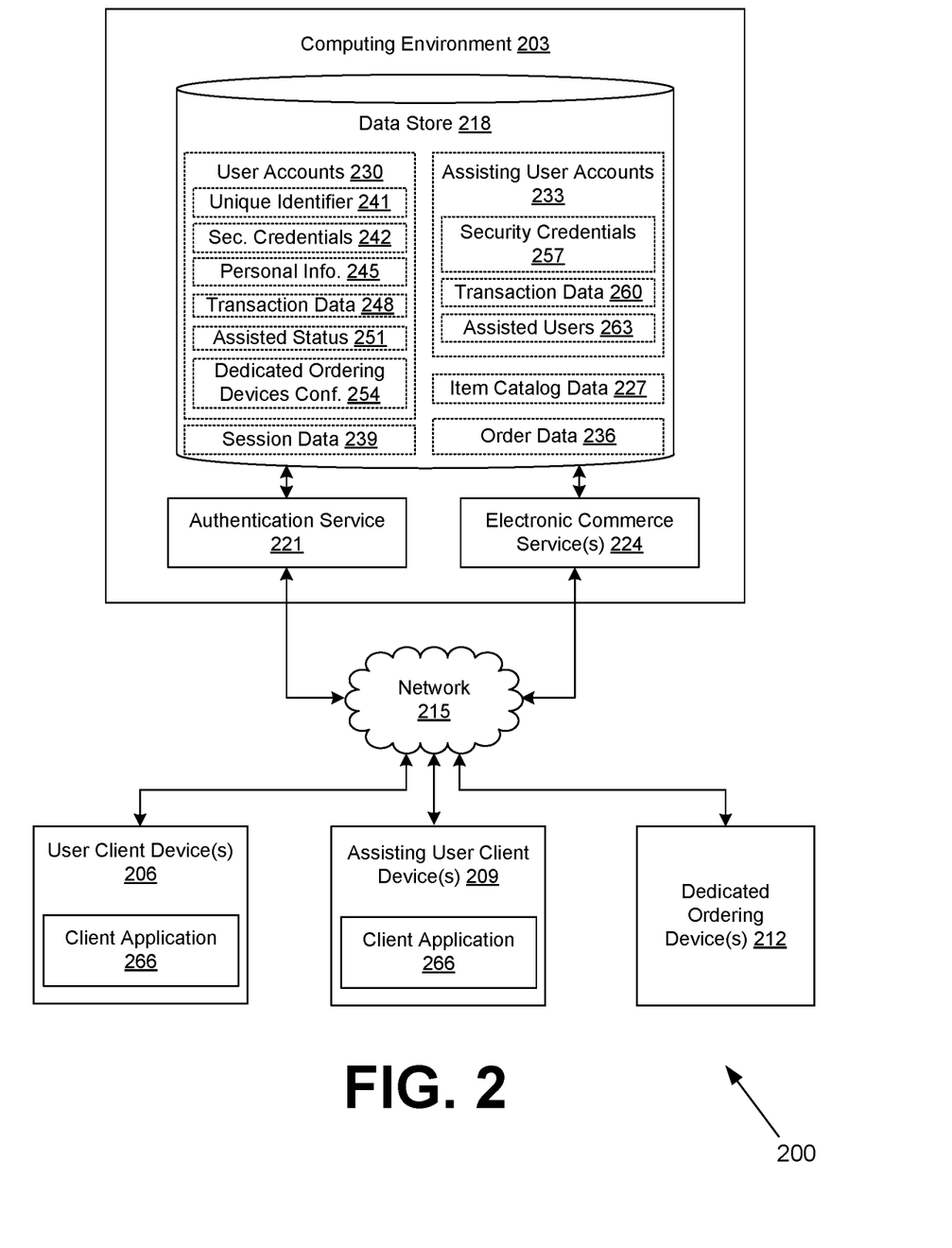
FIG. 2 is a schematic block diagram of a networked environment according to various embodiments of the present disclosure.

With reference to FIG. 2, shown is a networked environment 200 according to various embodiments. The networked environment 200 may include a computing environment 203, one or more user client devices 206, one or more assisting user client devices 209, and one or more dedicated ordering devices 212, which are in data communication with each other via a network 215. The network 215 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 218 that is accessible to the computing environment 203. The data store 218 may be representative of a plurality of data stores 218 as can be appreciated. The data stored in the data store 218, for example, is associated with the operation of the various applications and/or functional entities described below.

The components executed on the computing environment 203, for example, include an authentication service 221, one or more electronic commerce services 224, and other applications, services, processes, systems, engines, or functionality not discussed in detail herein. The authentication service 221 is executed to authenticate users at client devices for access to resources served by one or more of the electronic commerce services 224. As will be described, the authentication service 221 is able to authenticate users who have assisted user accounts (i.e., users who are being assisted by assisting users such as shopkeepers) as well as users who have self-managed user accounts. The authentication service 221 can also authenticate assisting users in order for them to manage assisted user accounts. The authentication service 221 and/or the electronic commerce services 224 may be configured to generate network pages such as web pages or other forms of network content, which may then be served to clients over the network 215 via hypertext transfer protocol (HTTP) or other communication protocols.

The electronic commerce services 224 include one or more services configured to implement an online presence of an electronic commerce provider, or an electronic marketplace that includes offerings from a multitude of different sellers. The functions enabled by the electronic commerce services 224 may include browsing an online catalog of items, adding items to an electronic shopping cart, placing orders for items, viewing order status (e.g., shipment status), managing orders (e.g., leaving feedback, making a return), and so on. The electronic commerce services 224 may also manage backend functions of the electronic commerce provider or electronic marketplace, such as order fulfillment, payment processing, delivery logistics, and so forth.

The data stored in the data store 218 includes, for example, item catalog data 227, user accounts 230, assisting user accounts 233, order data 236, session data 239, and potentially other data. The item catalog data 227 includes a variety of data regarding items offered for ordering via the electronic commerce services 224. The items may include products, services, goods, digital downloads, or other types of items. The items may be ordered for sale, lease, trial, download, or other form of consumption. The item catalog data 227 may include, for example, item titles, descriptions, available quantities, prices, available shipping methods, weights, hazardous material classifications, images, customer reviews, customer ratings, videos, and/or other data.

The user accounts 230 correspond to electronic accounts of end users (i.e., customers or potential customers) with the electronic commerce provider or electronic marketplace. The user accounts 230 may be associated with a unique identifier 241, one or more security credentials 242, personal information 245, transaction data 248, an assisted status 251, a dedicated ordering devices configuration 254, and/or other data. The unique identifier 241 uniquely identifies a user account 230 so as to distinguish it from other user accounts 230. For example, the unique identifier 241 may correspond to a communication channel, such as a telephone number, an email address, a shipping address, or other medium by which a user can receive communications.

The security credentials 242 are used to secure access to resources associated with the user account 230, such as the ability to track browsing, update personal information 245, place orders, manage existing orders, and so forth. The security credentials 242 may include passwords, security keys, personal identification numbers, biometric identifiers (e.g., voice profiles, eye profiles, face profiles, fingerprint profiles, etc.), cookie tokens, answers to knowledge-based questions, and so on.

The personal information 245 may include information about the user such as the user's name, address, contact information, personalization preferences, demographic data, payment instruments (e.g., checking accounts, credit cards), and so on. The transaction data 248 includes data describing one or more transactions performed via the user account 230. Such transactions may include browsing an electronic catalog or placing an order. The transactions may be performed by the user himself or herself when the user account 230 is self-managed, or with the assistance of an assisting user when the user account 230 is assisted.

The assisted status 251 indicates whether the user account 230 is self-managed and/or is associated with one or more assisting user accounts 233. As will be described, a user account 230 may initially be deemed an assisted user account where the user is provided assistance to complete a transaction, and then later may be upgraded or transformed into a self-managed user account where the user completes the transaction independently. Also, it is noted that an assisted status 251 may indicate that a user account 230 is assisted by multiple different assisting user accounts 233. In some cases, a user account 230 can be capable of being assisted and self-managed at the same time.

The dedicated ordering devices configuration 254 configures the operation of one or more dedicated ordering devices 212, such as a button that when activated causes one or more predefined items to be ordered. The dedicated ordering devices configuration 254 may include a destination address, a preferred shipping method, a preferred item or item option, a quantity to be ordered for each activation, and so forth.

The assisting user accounts 233 are accounts of assisting users, such as shopkeepers, managers, sales associates, and/or other agents of physical stores that participate in assisting users to interact with the electronic commerce provider or electronic marketplace. The assisting user accounts 233 may include one or more security credentials 257, transaction data 260, and identifications of one or more assisted users 263, a unique identifier, among other data. The security credentials 257 may include passwords, security keys, personal identification numbers, biometric identifiers (e.g., voice profiles, eye profiles, face profiles, fingerprint profiles, etc.), cookie tokens, answers to knowledge-based questions, and so on.

The transaction data 260 includes data describing one or more transactions performed via the user account 230 while assisted by the particular assisting user account 233. Such transactions may include browsing an electronic catalog or placing an order. The assisted users 263 correspond to user accounts 230 that are assisted or have previously been assisted by the assisting user account 233. The assisting user accounts 233 may be assigned on a per-user basis with permissions shared among multiple users at a physical store. Alternatively, a single assisting user account 233 may be shared among multiple users at a physical store.

The order data 236 describes one or more orders placed via the user accounts 230 which may be in one of several states of processing (e.g., placed, paid for, packed, shipped, delivered, awaiting returned, returned, canceled). The session data 239 includes various data relating to a particular session of interaction between a user account 230 and potentially an assisting user account with respect to an electronic commerce service 224.

The user client devices 206 and the assisting user client devices 209 are representative of a plurality of client devices that may be coupled to the network 215. The user client devices 206 and the assisting user client devices 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. In particular, the assisting user client device 209 may be a kiosk or other device configured for walk-up use. The user client devices 206 and the assisting user client devices 209 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The user client devices 206 and the assisting user client devices 209 may be configured to execute various applications such as a client application 266 and/or other applications. The client application 266 may be executed in a user client devices 206 and the assisting user client devices 209, for example, to access network content served up by the computing environment 203 and/or other servers, thereby rendering a user interface on the display. To this end, the client application 266 may comprise, for example, a browser, a dedicated application, etc., and the user interface may comprise a network page, an application screen, etc. The user client devices 206 and the assisting user client devices 209 may be configured to execute applications beyond the client application 266 such as, for example, email applications, social networking applications, word processors, spreadsheets, and/or other applications.

The dedicated ordering devices 212 may correspond to limited-purpose devices that are configured to place orders for items via the network 215 from the electronic commerce provider or within the electronic marketplace when activated by a user. For example, a dedicated ordering device 212 may comprise a button that when activated causes an order to be placed through an electronic commerce service 224. The nature of the order, how it will be paid for, where it will be shipped, and other parameters may be determined automatically from the dedicated ordering devices configuration 254 stored in the data store 218.

Figure 3A:
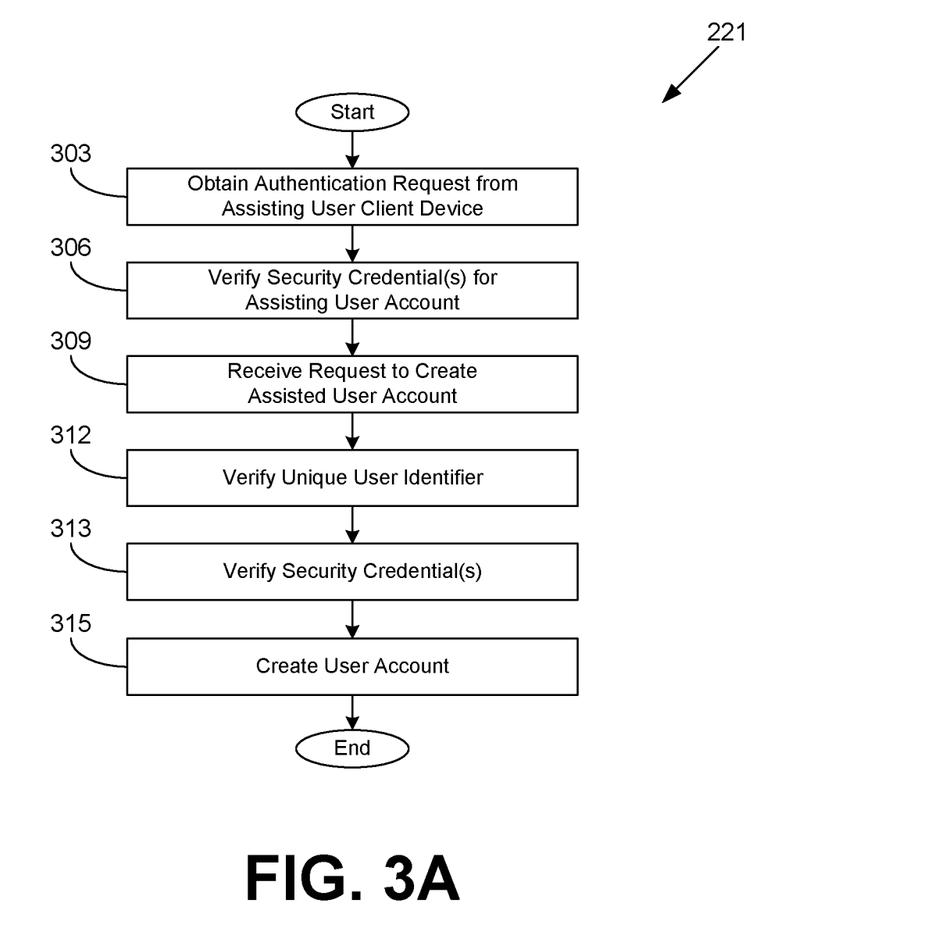
FIG. 3A is a flowchart illustrating one example of functionality implemented as portions of an authentication service implementing an assisted user account creation workflow executed in a computing environment in the networked environment of FIG. 2 according to various embodiments of the present disclosure.

Referring next to FIG. 3A, shown is a flowchart that provides one example of the operation of a portion of the authentication service 221 implementing an assisted user account creation workflow according to various embodiments. It is understood that the flowchart of FIG. 3A provides merely an example of the many different types of functional arrangements that may be employed to implement the operation of the portion of the authentication service 221 as described herein. As an alternative, the flowchart of FIG. 3A may be viewed as depicting an example of elements of a method implemented in the computing environment 203 (FIG. 2) according to one or more embodiments.

Beginning with box 303, the authentication service 221 receives an authentication request from an assisting user client device 209 (FIG. 2) via the network 215 (FIG. 2). For example, a shopkeeper or other agent in a physical store may log into a kiosk or a desktop terminal corresponding to the assisting user client device 209 by way of a username, a password, and/or other security credentials 257 (FIG. 2). The user may employ a web browser or other client application 266 (FIG. 2) executed in the assisting user client device 209. In box 306, the authentication service 221 verifies that the security credentials 257 provided by the assisting user client device 209 correspond to a valid assisting user account 233 (FIG. 2). If the security credentials 257 are invalid or if the assisting user account 233 is not available, the authentication request is denied.

In box 309, the authentication service 221 receives a request to create an assisted user account 230 (FIG. 2) for a customer from the authenticated assisting user account 233 via the assisting user client device 209. The request may specify a unique identifier 241 (FIG. 2), one or more proposed security credentials 242 (FIG. 2), personal information 245 (FIG. 2), a proposed transaction, and/or other information elicited via the client application 266. The assisting user may guide the assisted user through the process of entering the requested information, or the assisting user may simply allow the assisted user to fill out a form or respond to questions from a voice interface device by himself or herself.

In box 312, the authentication service 221 verifies that a valid unique identifier 241 has been provided. For example, the authentication service 221 may require that the unique identifier 241 correspond to a valid telephone number, a valid email address, a valid mailing address, or other communication channel, in order to confirm that the assisted user has access to the communication channel. In doing so, the authentication service 221 may confirm that the entered unique identifier 241 conforms to rules associated with the type of communication channel (e.g., a regular expression that matches valid email addresses, a check of the digits of a provided phone number to make sure it is a valid telephone number format).

Further, the authentication service 221 may send an ephemeral security credential (e.g., a one-time password) to the communication channel and then verify that the user has received it to confirm both that the communication channel is functioning correctly and that the user has access to the communication channel. As used herein, an ephemeral security credential may refer to a credential whose validity is time limited or use limited. For example, an ephemeral security credential may be valid for a fixed amount of time, such as thirty minutes. Also, an ephemeral security credential may valid for a fixed number of uses, such as a single use.

In some scenarios, the ephemeral security credential may be encoded as a bar code, two-dimensional bar code (e.g., quick-response (QR) code), or other image signal presented by the user client device 206. In other scenarios, the ephemeral security credential may be encoded as an audible signal presented by the user client device 206. The assisting user client device 209 may scan or capture the signal encoding the ephemeral security credential and then return it to the authentication service 221 for verification.

The ephemeral security credential may be sent in a communication that includes information to confirm the originating entity or electronic commerce provider, such as information generated through past interactions with the electronic commerce provider with respect to the communication channel or unique identifier 241. For example, the authentication service 221 may indicate a product that was shipped to a customer having the unique identifier 241. In some cases, in lieu of or in addition to an ephemeral security credential, the authentication service 221 may challenge the user with one or more knowledge-based questions regarding past interactions with the electronic commerce provider with respect to the communication channel or unique identifier 241. For example, the authentication service 221 may present a multiple choice question of which product was shipped to the customer as a gift within the past year.

In box 312, the authentication service 221 verifies the proposed security credentials 242 supplied with the request to create the assisted user account 230. In one example, the authentication service 221 may confirm that the proposed security credential 242 is unique with respect to the unique identifier 241. This may relate to scenarios in which a unique security credential 242 is used to distinguish among multiple assisted user accounts 230 for the same user but corresponding to different assisting user accounts 233. Also, the authentication service 221 may confirm that the proposed security credentials 242 meet any established requirements for credential strength (e.g., password length requirements, character set requirements, dictionary word exclusions, etc.).

In box 315, assuming that all checks on the information required to be provided for the assisted user account have passed, the authentication service 221 proceeds with creating an assisted user account 230 in the data store 218. The authentication service 221 may encode a user interface prompting the user to provide additional information such as name, contact information, addresses, and so forth, which can be stored in the personal information 245 (FIG. 2). The personal information 245 can also be harvested over time as the assisted user places orders or browses an item catalog. The authentication service 221 associates the assisted user account 230 with the assisting user account 233 such that the assisting user account 230 will have access to view and/or manage transactions of the assisted user that have been initiated under the assistance of the assisting user. In some cases, where an assisted user account already exists but is associated with a different assisting user account, a user may be prompted to provide a different security credential to maintain security of the account when it is used with the assistance of different assisting users at different assisting user client devices 209. Thereafter, the operation of the portion of the authentication service 221 ends.

Figure 3B:
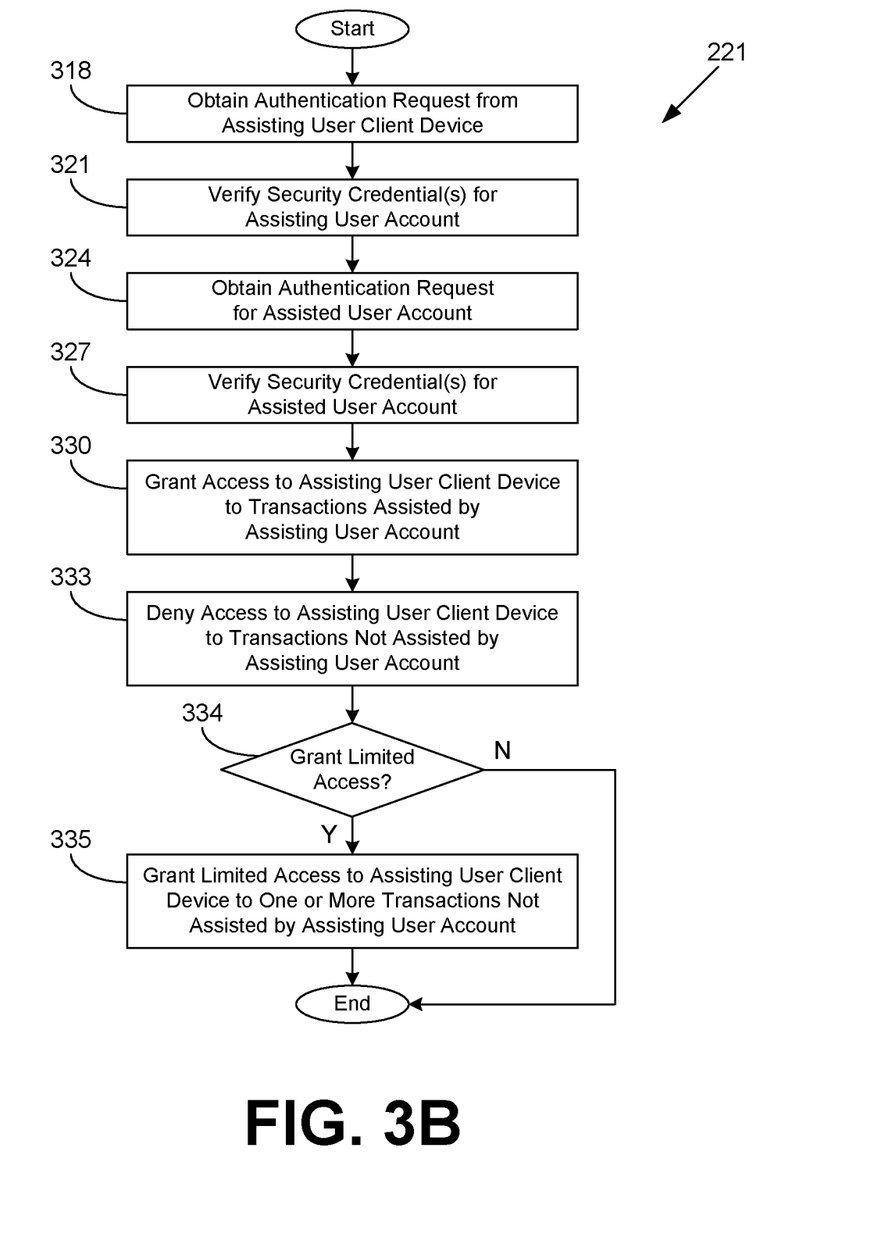
FIG. 3B is a flowchart illustrating one example of functionality implemented as portions of an authentication service authorizing access to an assisted user account executed in a computing environment in the networked environment of FIG. 2 according to various embodiments of the present disclosure.

Turning now to FIG. 3B, shown is a flowchart that provides one example of the operation of a portion of the authentication service 221 authorizing access to an assisted user account according to various embodiments. It is understood that the flowchart of FIG. 3B provides merely an example of the many different types of functional arrangements that may be employed to implement the operation of the portion of the authentication service 221 as described herein. As an alternative, the flowchart of FIG. 3B may be viewed as depicting an example of elements of a method implemented in the computing environment 203 (FIG. 2) according to one or more embodiments.

Beginning with box 318, the authentication service 221 obtains an authentication request from an assisting user client device 209 (FIG. 2). For example, an assisting user such as a shopkeeper or other agent of a physical store may log in to a kiosk or other walk-up terminal. The authentication request may specify one or more security credentials 257 (FIG. 2). In box 321, the authentication service 221 verifies the specified security credentials 257 for the corresponding assisting user account 233 (FIG. 2).

Subsequently, the assisting user assists a customer in logging in with his or her assisted user account 230 (FIG. 2), and in box 324, the authentication service 221 obtains an authentication request from the assisting user client device 209 that is already authenticated for the assisting user account 233, where the authentication request corresponds to an assisted user account 230. Thus, the session data 239 (FIG. 2) would indicate that the session of the assisting user account 233 overlaps with the session of the assisted user account 230 that is logging in.

The authentication request may present one or more security credentials 242 (FIG. 2) in addition to a unique identifier 241 (FIG. 2). In practice, the shopkeeper may ask the user for his or her password, and then enter it on behalf of the user. Alternatively, the user may be able to enter the password directly via a form or speaking into a voice interface device. In some embodiments, the user may present a biometric credential, such as a fingerprint, for scanning. Where a user is assisted in multiple physical stores or by multiple agents, an assisted user account may have multiple security credentials 242, such as a different password for each physical store or agent.

In box 327, the authentication service 221 verifies the security credentials 242 for the assisted user account 230. In some cases, the authentication service 221 may generate an ephemeral security credential such as a one-time password and send it to a communication channel corresponding to the unique identifier 241. The user then receives the one-time password via the communication channel and provides it via the assisting user client device 209 to confirm that he or she has access to the communication channel.

In box 330, the authentication service 221 grants access to the assisting user client device 209 to transactions in the transaction data 248 (FIG. 2) that are associated with, or have been assisted by, the assisted user account 230. For example, the authentication service 221 may grant access via the electronic commerce services 224 (FIG. 2) for the assisting user client device 209 to view an order history or manage order transactions for the assisting user account 230, where the history and transactions relates only to those transactions that have been assisted by the assisting user account 233 or related accounts for the given physical store.

In box 333, the authentication service 221 denies access to the assisting user client device 209 to an order history or other transactions in the transaction data 248 that are not assisted by the assisting user account 233 or other related accounts for the physical store. In this way, a customer can visit multiple physical stores and be assisted by multiple agents, but access to transaction information is limited only to transactions assisted by the particular agent or physical store.

However, in some situations, it may be advantageous to give an assisting user access to transactions assisted by others. For example, the customer may visit a physical store and inquire about a product that he or she previously ordered via a different physical store. Thus, in box 334, the authentication service 221 determines whether to grant limited access to other transactions to the assisting user. Approval of the customer may be solicited via a message to the user client device 206 (FIG. 2) sent via the communication channel corresponding to the unique identifier 241. That is to say, a confirmation can be received from a customer associated with the assisted user account 230 that the assisting user account 233 should be provided with access to another electronic commerce transaction completed through another user interaction with a different assisting user client device 209.

The confirmation from the customer may be received via a text message, showing a barcode or other image signal, playing an audio signal, providing another ephemeral security credential to the assisting user, and/or other approaches. If approved by the customer user, the authentication service 221 proceeds to box 335 and grants limited access to the assisting user client device 209 for one or more transactions in the transaction data 248 that were not assisted by the particular assisting user account 230. Thereafter, the operation of the portion of the authentication service 221 ends.

Figure 3C:
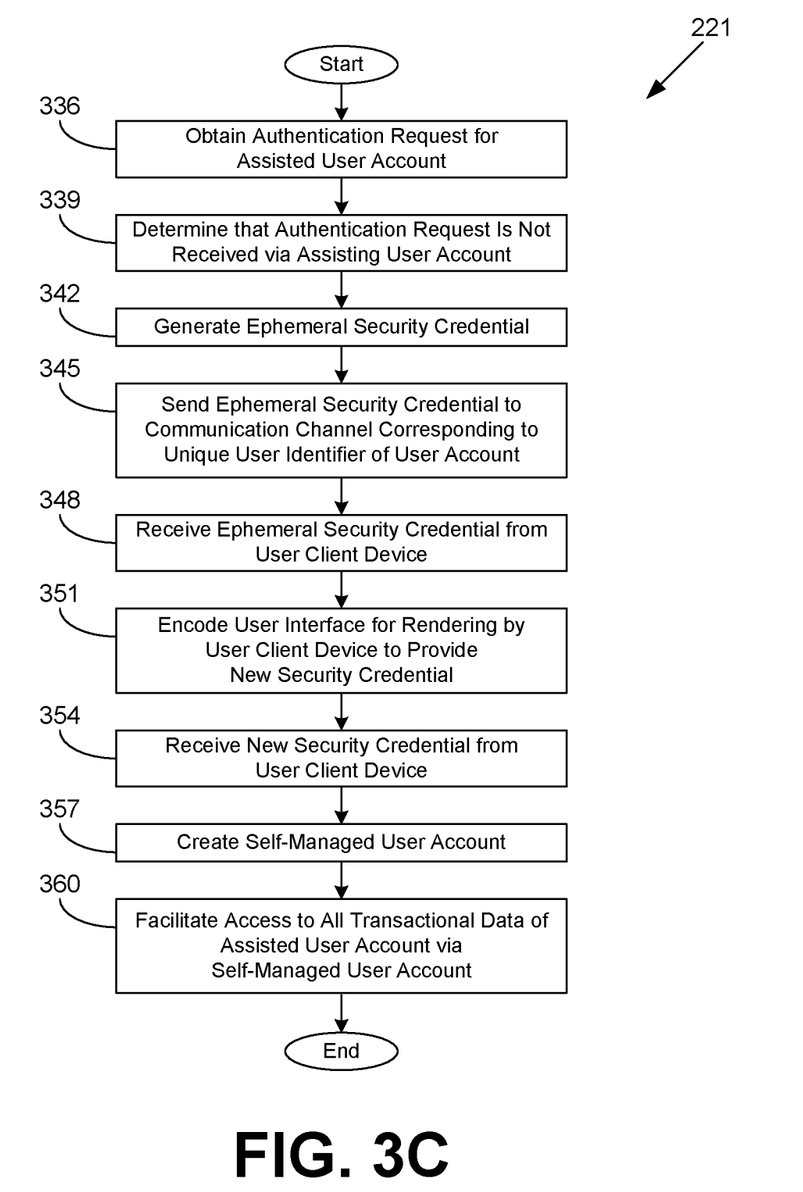
FIG. 3C is a flowchart illustrating one example of functionality implemented as portions of an authentication service implementing an account migration workflow executed in a computing environment in the networked environment of FIG. 2 according to various embodiments of the present disclosure.

Continuing to FIG. 3C, shown is a flowchart that provides one example of the operation of a portion of the authentication service 221 implementing an account migration workflow according to various embodiments. It is understood that the flowchart of FIG. 3C provides merely an example of the many different types of functional arrangements that may be employed to implement the operation of the portion of the authentication service 221 as described herein. As an alternative, the flowchart of FIG. 3C may be viewed as depicting an example of elements of a method implemented in the computing environment 203 (FIG. 2) according to one or more embodiments.

Beginning with box 336, the authentication service 221 receives an authentication request corresponding to an assisted user account 230 (FIG. 2). The authentication request may present the unique identifier 241 (FIG. 2) and a corresponding security credential 242 (FIG. 2) of an assisted user account 230. However, in box 339, the authentication service 221 determines that the authentication request is not received via an assisting user account 233 (FIG. 2). That is to say, the authentication request is not received through an assisting user client device 209 that is authenticated for access to an assisting user account 233. Thus, the authentication request is received from a user client device 206 (FIG. 2). The authentication service 221 may determine that the authentication request is received from a user client device 206 instead of the assisting user client device 209 where the client device has an unrecognized device identifier or lacks a registration cookie. For example, a user may have obtained Internet access for the user client device 206 or may have developed technical expertise or proficiency for the user client device 206 in order to interact with the electronic commerce services 224 (FIG. 2) directly.

In box 342, the authentication service 221 generates an ephemeral security credential such as a one-time password. In box 345, the authentication service 221 sends the ephemeral security credential to the communication channel corresponding to the unique identifier 241 (FIG. 2) of the user account 230. In box 348, the authentication service 221 receives the ephemeral security credential back from the user client device 206, thereby verifying that the user client device 206 is controlled by a user with access to a communication channel associated with the assisted user account 230.

In box 351, the authentication service 221 encodes a user interface for rendering by the user client device 206 that prompts the user to provide a new security credential. In box 354, the authentication service 221 receives the new security credential from the user client device 206. With respect to a measure of credential strength, the authentication service 221 may require a stronger security credential for a self-managed user account 230 as opposed to an assisted user account 230. Thus, the authentication service 221 may evaluate the new security credential for compliance with credential strength criteria that are greater than credential strength criteria under which the previous security credential is evaluated.

For example, the authentication service 221 may require a longer password, characters from more character sets (e.g., uppercase, lower case, special), non-dictionary terms, etc., for a self-managed user account 230. By contrast, the authentication service 221 may allow a dictionary word to be used for an assisted user account 230. In box 357, upon confirming that the new security credential meets credential strength requirements, the authentication service 221 creates a self-managed user account 230 for the user. As understood herein, creating the self-managed user account 230 may entail migration, such as updating the assisted status 251 (FIG. 2) for an assisted user account 230, thereby designating it as a self-managed user account 230. The authentication service 221 may store the new security credential or a hashed or otherwise encrypted or encoded version thereof in the security credentials 242 (FIG. 2). Also, if the user account 230 is associated with a dedicated ordering device 212 (FIG. 2), the authentication service 221 may update the dedicated ordering devices configuration 254 (FIG. 2) automatically to point to a default delivery location or address provided by the user in lieu of a delivery location of the assisting user.

In box 360, the authentication service 221 facilitates access to all transaction data 248 of the assisted user account 230 via the self-managed user account 230. For example, the self-managed user account 230 may be able to see and manage orders previously placed with the assistance of an assisting user. This access may be granted upon receipt of a user confirmation. Otherwise, the self-managed user account 230 may not have access to previous transactions performed through an assisted user account 230. The user is also able to access and manage personal information 245 (FIG. 2) previously established for the assisted user account 230. Thereafter, the operation of the portion of the authentication service 221 ends.

In one embodiment, a user may continue to use security credentials 242 of the assisted user account 230 via an assisted process, where the security credential 242 would indicate that the limited use assisted user account 230 is desired. The assisted user account 230 may not have access to transaction data 248 corresponding to self-managed transactions. In another embodiment, the previous security credentials 242 for the assisted user account 230 would be invalidated and not useable after a self-managed user account 230 is created.

Figure 4:
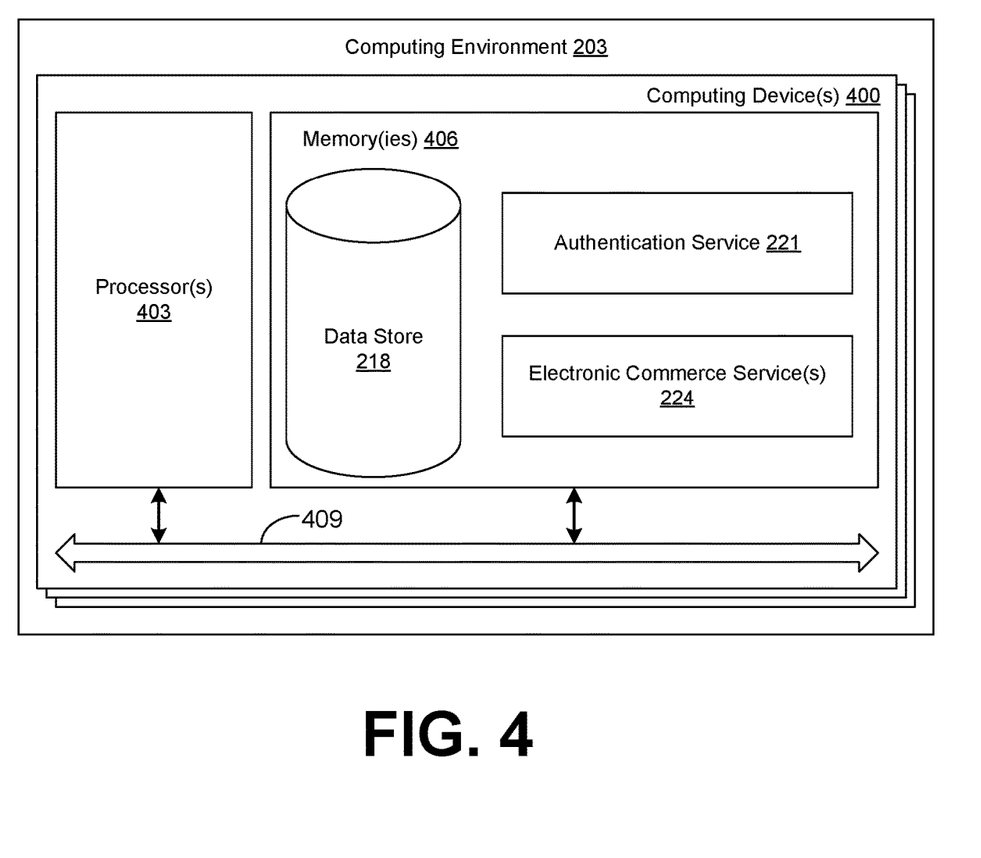
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the authentication service 221, the electronic commerce services 224, and potentially other applications. Also stored in the memory 406 may be a data store 218 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the authentication service 221, the electronic commerce services 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-3C the functionality and operation of an implementation of portions of the authentication service 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A-3C show a specific order of execution, it is understood that the order of execution may differ from that which is depicted. For example, the order of execution of two or more blocks may be scrambled relative to the order shown. Also, two or more blocks shown in succession in FIGS. 3A-3C may be executed concurrently or with partial concurrence. Further, in some embodiments, one or more of the blocks shown in FIGS. 3A-3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 221 and the electronic commerce services 224, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 221 and the electronic commerce services 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   authenticate a first client device for access to an assisting user account, wherein the first client device corresponds to a kiosk in a physical store, and the kiosk is operated by an agent of the physical store having access to the assisting user account;
   create an assisted user account having a unique user identifier and a first security credential in response to an assisted account creation request received from the first client device, the assisted account creation request specifying the unique user identifier and the first security credential, the unique user identifier corresponding to a communication channel;
   record transaction data corresponding to at least one transaction initiated by the first client device authenticated for access to the assisting user account on behalf of the assisted user account;
   receive an authentication request from a second client device that is not authenticated for access to the assisting user account, the authentication request specifying the unique user identifier corresponding to the assisted user account;
   generate an ephemeral security credential;
   send the ephemeral security credential to the communication channel corresponding to the unique user identifier;
   create a self-managed user account having the unique user identifier in response to receiving the ephemeral security credential from the communication channel, the self-managed user account being inaccessible to the assisting user account;
   receive a second security credential from the second client device;
   associate the self-managed user account with the second security credential; and
   facilitate access to the transaction data by the second client device via the self-managed user account.

2. The non-transitory computer-readable medium of claim 1, wherein when executed the program further causes the at least one computing device to at least:
   authenticate a third client device for access to another assisting user account;
   receive another authentication request from the third client device, the other authentication request specifying the unique user identifier and the first security credential;
   record additional transaction data corresponding to another at least one transaction initiated by the third client device on behalf of the assisted user account; and
   facilitate access to the additional transaction data but not the transaction data by the third client device.

3. The non-transitory computer-readable medium of claim 1, wherein when executed the program further causes the at least one computing device to at least receive a user confirmation to associate the transaction data of the assisted user account with the self-managed user account.

4. A system, comprising:
   at least one computing device; and
   at least one service executable in the at least one computing device, wherein when executed the at least one service causes the at least one computing device to at least:
      receive a first authentication request from a first client device that is authenticated for access to an assisting user account, the first authentication request specifying a unique user identifier corresponding to a communication channel and a security credential, wherein the first client device corresponds to a kiosk in a physical store, and the kiosk is operated by an agent of the physical store having access to the assisting user account;

authenticate the first client device for access to an assisted user account, wherein the assisted user account is in an assisted status such that one or more previous transactions with the assisted user account have been assisted by the assisting user account;

receive a second authentication request from a second client device, the second authentication request specifying the unique user identifier;

determine that the unique user identifier corresponds to the assisted user account but the second client device is not logged in under the assisting user account;

generate an ephemeral security credential;

send the ephemeral security credential to the communication channel; and create a self-managed user account having the unique user identifier in response to receiving the ephemeral security credential from the second client device, the self-managed user account being inaccessible to the assisting user account, and the self-managed user account providing access to the one or more previous transactions.

5. The system of claim 4, wherein the first client device has access to transaction data associated with the assisted user account where the assisting user account assisted in completing a transaction, and first client device does not have access to other transaction data associated with the assisted user account where the assisting user account did not assist in completing the transaction.

6. The system of claim 4, wherein the ephemeral security credential is at least one of: time limited or use limited.

7. The system of claim 4, wherein when executed the at least one service causes the at least one computing device to at least receive a user confirmation whether to associate transaction data of the assisted user account with the self-managed user account.

8. The system of claim 4, wherein the self-managed user account has access to transaction data associated with the assisted user account and transaction data associated with the self-managed user account.

9. The system of claim 4, wherein the assisting user account has access to transaction data associated with the assisted user account but not transaction data associated with the self-managed user account.

10. The system of claim 4, wherein the authentication request includes a first security credential associated with the assisted user account, and when executed the at least one service causes the at least one computing device to at least:

request from the second client device a second security credential that differs from the first security credential;

receive the second security credential from the second client device; and associate the self-managed user account with the second security credential.

11. The system of claim 10, wherein when executed the at least one service causes the at least one computing device to at least evaluate the second security credential for compliance with first credential strength criteria that are greater than second credential strength criteria under which the first security credential is evaluated.

12. A method, comprising:

receiving, via at least one of one or more computing devices, a first authentication request from a first client device that is authenticated for access to a first assisting user account, the first authentication request specifying a unique user identifier corresponding to a communication channel and a security credential, wherein the first client device corresponds to a kiosk in a physical store, and the kiosk is operated by an agent of the physical store having access to the assisting user account;

authenticating, via at least one of the one or more computing devices, the first client device for access to an assisted user account, wherein the assisted user account is in an assisted status such that transactions associated with the assisted user account are assisted by at least one authenticated assisting user on behalf of an end user;

completing, via at least one of the one or more computing devices, an electronic commerce transaction for the assisted user account through at least one user interaction with the first client device;

authenticating, via at least one of the one or more computing devices, a second client device for access to the assisted user account while authenticated for access to a second assisting user account;

denying, via at least one of the one or more computing devices, the second client device management access to the electronic commerce transaction in response to determining that the electronic commerce transaction was completed with assistance of the first assisting user account and not the second assisting user account; and migrating, via at least one of the one or more computing devices, the assisted user account to become a self-managed user account controlled by the end user and inaccessible to the first assisting user account and the second assisting user account.

13. The method of claim 12, further comprising:

receiving, via at least one of the one or more computing devices, a confirmation from the end user associated with the assisted user account that the second assisting user account should be provided with access to another electronic commerce transaction completed through another user interaction with the first client device; and facilitating, via at least one of the one or more computing devices, access by second client device to the other electronic commerce transaction.

14. The method of claim 12, wherein the assisted user account is associated with a plurality of security credentials, the security credential corresponding to a first one of the plurality of security credentials, individual ones of the plurality of security credentials corresponding to a respective one of a plurality of assisting user accounts, the method further comprising:

receiving, via at least one of the one or more computing devices, a second one of the plurality of security credentials from the second client device.

15. The method of claim 12, further comprising:

receiving, via at least one of the one or more computing devices, a second authentication request from a third client device for access to the assisted user account; and verifying, via at least one of the one or more computing devices, that the third client device is controlled by the end user having access to a communication channel associated with the assisted user account.

16. The method of claim 15, wherein verifying that the third client device is controlled by the user with access to the communication channel associated with the assisted user account further comprises:
- generating, via at least one of the one or more computing devices, an ephemeral security credential;
- sending, via at least one of the one or more computing devices, the ephemeral security credential to the communication channel; and
- receiving, via at least one of the one or more computing devices, the ephemeral security credential from the third client device.

17. The method of claim 15, wherein migrating the assisted user account to become the self-managed user account further comprises disabling, via at least one of the one or more computing devices, access of the first assisting user account and the second assisting user account to manage the assisted user account.

18. The method of claim 15, wherein migrating the assisted user account to become the self-managed user account further comprises:
- encoding, via at least one of the one or more computing devices, a user interface for rendering by the third client device, the user interface requesting a new security credential from the end user;
- receiving, via at least one of the one or more computing devices, the new security credential from the third client device; and
- associating, via at least one of the one or more computing devices, the new security credential with the self-managed user account.

19. The method of claim 15, wherein migrating the assisted user account to become the self-managed user account further comprises modifying, via at least one of the one or more computing devices, a default delivery location associated with a dedicated ordering device of the assisted user account.

20. The method of claim 12, further comprising receiving, via at least one of the one or more computing devices, a confirmation from the end user whether to associate transaction data of the assisted user account with the self-managed user account.

\* \* \* \* \*